United States Patent [19]

Hen

[11] Patent Number: 5,399,270

[45] Date of Patent: * Mar. 21, 1995

[54] INHIBITION OF SCALE FORMATION FROM OIL WELL BRINES UTILIZING A SLOW RELEASE COMPOSITION

[75] Inventor: John L. Hen, Skillman, N.J.

[73] Assignee: Mobil Oil Corporation, Fairfax, Va.

[*] Notice: The portion of the term of this patent subsequent to Aug. 25, 2009 has been disclaimed.

[21] Appl. No.: 925,134

[22] Filed: Aug. 6, 1992

Related U.S. Application Data

[63] Continuation-in-part of Ser. No. 837,544, Feb. 14, 1992, Pat. No. 5,141,655, which is a continuation of Ser. No. 531,280, May 13, 1990, abandoned.

[30] Foreign Application Priority Data

| Apr. 29, 1991 | [AU] | Australia | 76061/91 |
| May 1, 1991 | [CA] | Canada | 2041586 |
| May 2, 1991 | [EP] | European Pat. Off. | 91107098 |
| May 23, 1991 | [NG] | Nigeria | 89/91 |
| May 29, 1991 | [TR] | Turkey | 33267 |
| May 30, 1991 | [NO] | Norway | 912091 |

[51] Int. Cl.$^6$ ............ E21B 43/25; C23F 11/14; C23F 11/12; C23F 11/167
[52] U.S. Cl. ............ 507/224; 166/279; 540/472; 507/927; 507/236; 507/237; 507/243; 507/244
[58] Field of Search ............ 540/472; 166/279; 252/8.552

[56] References Cited

U.S. PATENT DOCUMENTS

| 3,654,993 | 4/1972 | Smith et al. | |
| 3,827,977 | 8/1974 | Miles et al. | |
| 4,357,248 | 11/1982 | Berkshire et al. | |
| 4,602,683 | 7/1986 | Meyers | 166/279 |

*Primary Examiner*—Gary Geist
*Attorney, Agent, or Firm*—A. J. McKillop; M. D. Keen

[57] ABSTRACT

A method for the inhibition of scale deposition on the surfaces of a well coproducing oil and scale forming brines comprising injecting into the well reservoir an acidic aqueous solution at a first pH containing dissolved therein a scale inhibitor, multivalent metal ions, and a heat-sensitive pH-increasing substance containing no more than 10 carbon atoms, which decomposes at elevated temperatures liberating an alkaline compound such that the solution is inherently heated by the higher ambient reservoir temperature to a temperature at which the alkaline compound is liberated from the heat-sensitive substance thus raising the pH of the solution to a point at which a sparingly soluble multivalent metal salt of the scale inhibitor is phase separated from the solution on the porous surfaces of the reservoir rock formation, providing for a slow release of inhibitor into the produced brines when the well is in its production phase.

16 Claims, No Drawings

INHIBITION OF SCALE FORMATION FROM OIL WELL BRINES UTILIZING A SLOW RELEASE COMPOSITION

CROSS-REFERENCE TO RELATED APPLICATION

This application is a continuation-in-part of application Ser. No. 07/837,544, filed Feb. 14, 1992, now U.S. Pat. No. 5,141,655, which is a continuation of application Ser. No. 07/531,280, filed May 13, 1990, now abandoned.

BACKGROUND OF THE INVENTION

1. Field of the Invention

This invention relates to the inhibition of scale formation from oil well brines utilizing a slow release inhibitor composition.

2. Information Disclosure Statement Including Description of Related Art

The following information is disclosed in accordance with the terms of 37 CFR 1.56, 1.97 and 1.98.

In the production of crude oil from underground wells, mineral scales such as barium sulfate, strontium sulfate, calcium sulfate and calcium carbonate are often formed on wellbore and equipment surfaces where oil and water containing dissolved salts are coproduced. The formation of scale can slow oil production rate and, at the extreme, stop production completely. An expedient often utilized is to inject or "squeeze" a solution of a scale inhibitor such as a polyphosphonate or a polyacrylic acid into the reservoir rock and allow the absorbed inhibitor to desorb during fluids production. In practice, however, the desorption process is often found to be quite rapid once production is resumed necessitating frequent shutdowns for additional treatments. This has the effect of substantially reducing the productivity of the well.

Various improvements in the adsorption and desorption of scale inhibitors have been proposed, some of which are disclosed in the following prior art references.

U.S. Pat. No. 3,654,993, issued Apr. 11, 1972, to Smith et al., teaches the injection into a geological subterranean formulation of an aqueous, acidic solution of a corrosion inhibiting composition comprising any of various complex corrosion inhibitors including relatively high molecular weight "ureas" and "amines," and a polyacrylic acid or salt thereof. Subsequent to the injection of the solution into the formation, a base is injected causing a precipitate to form in the formation which is sparingly soluble in the liquids produced in the formation thus preventing the inhibitor from being rapidly washed out by the produced liquids.

U.S. Pat. No. 3,827,977, issued Aug. 6, 1974 to Miles et al. discloses the in situ deposition in the porous rock formation adjacent to a well bore of a polyvalent metal salt of a polyacrylic acid or partially hydrolyzed polyacrylamide inhibitor by introducing into the porous formation a strongly acidic aqueous solution of a salt of the inhibitor and the polyvalent metal. The acid is partially neutralized by the reservoir liquid causing the polyvalent salt of the inhibitor to phase separate on the porous surfaces.

U.S. Pat. No. 4,357,248 issued Nov. 2, 1982 to Berkshire et al., teaches the inhibition of scale formation in a producing well by injecting a self-reacting alkaline aqueous solution of a pH-lowering reactant, a scale inhibitor and a compound containing multivalent cations, which solution subsequently precipitates a slightly soluble scale inhibitor within the reservoir.

U.S. Pat. No. 4,602,683, issued Jul. 29, 1986 to Meyers, discloses the inhibition of scale deposition during the operation of an oil well by injecting an inhibitor solution into a subsurface brine producing formation at a higher first pH, and thereafter subjecting the solution to a fluid or substance which reduces the higher first pH to a lower second pH causing precipitation of the scale inhibitor in the formation.

None of the foregoing references discloses or suggests the injection into a well reservoir of an aqueous acid solution containing a scale inhibitor, multivalent metal ions, and a heat-sensitive substance which decomposes at the temperature of the reservoir liberating an alkaline compound, thus raising the pH of the solution and causing a multivalent metal salt of the scale inhibitor to phase separate out onto the surfaces of reservoir rock formation.

Parent application Ser. No. 07/837,544, filed Feb. 14, 1992, now U.S. Pat. No. 5,141,655 discloses and claims a method for inhibiting scale formation in oil well reservoir surfaces by injecting an aqueous solution containing a scale inhibitor, multivalent metal ions, and a heat-sensitive, pH-increasing substance which may be urea or any of certain urea derivatives, an acyl azide, or cyanic acid.

SUMMARY OF THE INVENTION

In accordance with the invention, a method is provided for the inhibition of scale deposition on the surfaces of a well coproducing oil and scale forming brines comprising injecting into the well reservoir an acidic aqueous composition at a first pH containing dissolved therein a scale inhibitor and multivalent metal ions, and also containing dissolved or emulsified therein a heat-sensitive pH-increasing substance having no more than 10 carbon atoms which decomposes at elevated temperatures liberating an alkaline compound, e.g. ammonia or an amine. The composition is then inherently heated by the higher ambient reservoir temperature to a temperature at which the alkaline compound is liberated from the heat-sensitive substance raising the pH of the composition to a point at which a sparingly soluble multivalent metal salt of the scale inhibitor is phase separated from solution on the surfaces of the reservoir rock formation, providing for a slow release or desorption of inhibitor into the produced brines when the well is in its production phase.

Unlike the case with some of the prior art methods described previously, the method of this invention provides for the efficient placement of a sparingly soluble scale inhibitor in the well reservoir capable of slowly releasing inhibitor into the produced brines, without the requirement for efficient mixing with such brines, which is difficult to satisfy in some sandstone formations, or the necessity for using more than one solution for the injection of the inhibitor. The method greatly enhances the retention of scale inhibitor while keeping to a minimum damage of the reservoir rock which could be caused by excessive precipitation of multivalent metal salt of inhibitor on the porous reservoir surfaces.

DESCRIPTION OF PREFERRED EMBODIMENTS

The scale inhibitors contemplated under this invention contain a multiplicity of reactive groups, for example, carboxylate and/or phosphonate, which are capable of interacting with the polyvalent metal ions in the produced brines to prevent or minimize the deposition of scale on reservoir, wellbore, and equipment surfaces. The inhibitor, may be, for example, a polycarboxylate, e.g., a polymeric polycarboxylate such as a homopolymer or copolymer (composed of two or more co-monomers) of an alpha, beta-ethylenically unsaturated acid monomer such as acrylic acid, methacrylic acid, a diacid such as maleic acid (or maleic anhydride), itaconic acid, fumaric acid, mesoconic acid, citraconic acid and the like, monoesters of diacids with alkanols, e.g., having 1–8 carbon atoms, and mixtures thereof. When the inhibitor is a copolymer, the other component monomer may be any alpha, beta-ethylenically unsaturated monomer with either a non-polar group such as styrene or olefinic monomers, or a polar functional group such as vinyl acetate, vinyl chloride, vinyl alcohol, alkyl acrylates, vinyl pyridine, vinyl pyrrolidone, acrylamide or acrylamide derivatives, etc., or with an ionic functional group such as styrenesulfonic acid, 2-acrylamido-2-methylpropanesulfonic acid (AMPS), vinylsulfonic acid, or vinylphosphonic acid. Certain of the foregoing copolymers may be prepared by aftertreating a homopolymer or a different copolymer, e.g., copolymers of acrylic acid and acrylamide by partially hydrolyzing a polyacrylamide. The contemplated polymeric polycarboxylate inhibitors also include the foregoing homopolymers and copolymers chemically modified to include other functional groups contributing to their performance, e.g., the phosphino-polyacrylic acids disclosed in U.S. Pat. No. 4,105,551 and sold under the trademark "Belsperse 161" or "Belasol S-29" by Ciba Geigy. The molecular weight range of the polymeric polycarboxylate inhibitor utilized in this invention may be, for example, from about 500 to 10,000.

Also suitable as the scale inhibitor of this invention are the monomeric and polymeric phosphonates, e.g., aminomethylenephosphonates such as aminotri(methylenephosphonic acid), ethylenediaminetetra(methylenephosphonic acid), hexamethylenediaminetetra(methylenephosphonic acid), and diethylenetriaminepenta(methylenephosphonic acid), 1-hydroxyethylidene-1,1-diphosphonic acid, and homopolymers and copolymers of vinylphosphonate.

Another class of inhibitors which may be used in practicing the method of this invention are organic phosphate esters such as phosphate esters of polyols and their salts containing one or more 2-hydroxyethyl groups, and hydroxylamine phosphate esters obtained by reacting polyphosphoric acid or phosphorus pentoxide with hydroxylamines such as diethanolamine or triethanolamine. Some examples of this class of inhibitors are disclosed in Jack C. Cowan and Donald J. Weintritt, *Water-Formed Scale Deposits*, (Houston: Gulf Publishing Co., 1976), 284 and 285.

The inhibitor may be present in the injected solution in an amount, for example, in the range of about 0.25 to 15 wt. % preferably about 0.5 to 5 wt. %, based on the total weight of the solution.

The multivalent metal ions are those capable of forming sparingly soluble salts of the scale inhibitor at a pH higher than that of the initial injected solution. Some multivalent metal ions which can be used are, for examples, alkaline earth metal ions, particularly calcium and magnesium, aluminum (+3), chromium (+3), iron (+3), titanium (+3), zirconium (+4), zinc (+2), and copper (+2). The preferred multivalent metal ions are calcium and magnesium. The ions are utilized in the form of a water-soluble Salt, preferably containing an anion which does not contribute to scale formation, e.g., chloride or nitrate. The amount of dissolved multivalent metal ions employed in the solution is in the range, for example, of about 0.05 to 5.0, preferably about 0.20 to 2.50 equivalents per equivalent of inhibitor.

The heat-sensitive, pH-increasing compound may be, for example, urea or a urea derivative, having the formula:

$$R^1R^2NCONR^3R^4$$

where the R's are the same or different and each may be, for example, hydrogen, an alkyl group containing 1 to 8 carbon atoms or an aromatic group, e.g., phenyl or tolyl consistent with a total number of carbon atoms no greater than 10. Compounds which may be employed are, for example, urea, 1-methylurea, 1,1-dimethylurea, 1,3-dimethylurea, 1,1,3-trimethylurea, 1-ethylurea, 1,1-diethylurea, 1,3-diethylurea, n-propylurea, n-butylurea, 1-phenylurea, 1-methyl-3-phenylurea and 1-ethyl-1-phenylurea.

When urea or any of the contemplated urea derivatives are heated to an elevated temperature, e.g., at least about 40° C. such as occurs in the reservoirs of producing wells, they liberate ammonia and/or amine in accordance with the following equation.

$$R^1R^2NCONR^3R^4 + H_2O \xrightarrow{\Delta} NHR^1R^2 + NHR^3R^4 + CO_2$$

The liberated ammonia or amine is a basic substance which acts to increase the pH of the injected solution to a level at which a sparingly soluble multivalent metal salt of the inhibitor phase separates and slowly releases inhibitor into the reservoir during production thus minimizing scale deposition. The $CO_2$ liberated may or may not dissolve in the brine depending on the reservoir conditions. In any case there is a two to one molar ratio of amine to $CO_2$ liberated.

Another group of heat-sensitive pH-increasing compounds which may be used are organic azides containing the group $-N=N=N$. For example acyl azides having the formula $RCON=N=N$, on being heated to above about 80° C., tend to rearrange to the isocyanate $R-N=C=O$ with the liberation of nitrogen ($N_2$); the isocyanate then reacts with water to yield the amine and $CO_2$ in accordance with the following equation:

$$R-N=C=O + H_2O \xrightarrow{\Delta} RNH_2 + CO_2$$

Since one mole of $CO_2$ is released with each mole of amine, acyl azides are useful in the special case where the produced water is fully saturated with native $CO_2$ under reservoir conditions, and the $CO_2$ liberated from the reaction goes into the oil phase. Under these conditions, the amine has the effect of increasing the pH of the inhibitor solution providing for the phase separation and subsequent slow release of the multivalent metal salt of the inhibitor, as described previously in connection with the use of urea or a urea derivative as the heat-sensitive substance.

Azides which may be used are, for example, acetyl azide, propionyl azide, malonyl azide, succinyl azide, phthaloyl azide and other acyl diazides.

Other heat-sensitive base releasing materials which may be used are, for example, cyanic acid, and amines which have been previously sorbed into activated carbon or a similar sorption matrix.

A group of heat-sensitive, pH-increasing compounds which decompose at relatively low temperatures and are therefore particularly useful for the treatment of low temperature oil well reservoirs, are the tetraazatricycloalkanes such as hexamethylenetetramine (HMTA);

1,2,5,7-tetraazatricyclo-[3.3.1.1.$^{3,7}$] decane;
1,4,6,9-tetraazatricyclo-[7.1.1.1.$^{4,7}$] dodecane; and
1,3,6,8-tetraazatricyclo-[4.4.1.1.$^{3,8}$] dodecane. In general, members of this class of heat-sensitive substances may be employed in reservoirs at a temperature of about 20° to 85° C. preferably about 40° to 60° C.

The heat-sensitive pH-increasing substance is present in an amount sufficient to raise the pH in the reservoir sufficiently to effect the phase separation on the porous surfaces of the reservoir of all or part of the inhibitor as its sparingly soluble multivalent metal salt, such that an adequate amount of inhibitor is fed into the well formation during the production phase of the well to significantly inhibit scale deposition. In many cases, the heat-sensitive pH-increasing substance will be utilized in the original inhibitor solution to be injected in an amount of about 0.01 to 5.0 wt. %, preferably about 0.05 to 2.0 wt. % based on the weight of the solution, and sufficient sparingly soluble multivalent salt of inhibitor is deposited on the surfaces of the well formation to maintain the concentration of inhibitor in the produced brine in the range of about 0.05 to 50 ppm, preferably about 0.5 to 10 ppm.

As stated, in order to prevent phase separation or precipitation of the multivalent salt of the inhibitor in the composition to be injected, such composition must have an initial pH in the acidic range, e.g., about 1.0 to 6.0, preferably 2.5 to 4.5. Such acidity may be obtained at least partially by the use of an acidic inhibitor. However, if the inhibitor is not sufficient for the purpose, additional acidity of the initial solution may be obtained by the addition of a strong acid, e.g., hydrochloric or nitric acid, or a combination of strong and weak acids. Sulfuric acid is generally not used for this purpose since sulfate ions can contribute significantly to scale deposition.

Substantially any source of water may be used as the aqueous solvent in the preparation of the initial inhibitor solution to be injected, e.g., sea water or inland surface or underground waters. However, the nature of the initial aqueous solvent utilized could effect the quantity and possibly the nature of the added inhibitor solution components to obtain the optimum properties of the solution in carrying out the inventive process.

The inhibitor solution is injected or squeezed into the reservoir formation using techniques well-known in the art. In general, the benefits of the process will be obtained if the temperature within the reservoir formation is, for example, in the range of about 20 to 200, preferably about 40° to 150° C.

The invention is further illustrated by the following examples. In Examples 1 to 3, the scale inhibitor was a phosphino-polyacrylic acid (PPA), produced as shown in U.S. Pat. No. 4,105,551 and sold by Ciba Geigy under the trademark "Belsperse 161" and having an average molecular weight of 3000–4000, a specific gravity of 1.26, a pH neat of less than 3.5, a pH of 1% aqueous solution of 2 to 3, and a phosphorous content (as P) of 0.86%; the multivalent metal ions were calcium added as calcium chloride; and the heat-sensitive pH-increasing substance was urea. In all the examples the simulated sea water utilized as the aqueous solvent medium had the following composition:

TABLE 1

| Components | Concentration, grams/liter |
|---|---|
| $MgCl_2$ $6H_2O$ | 11.70 |
| $CaCl_2$ $2H_2O$ | 1.47 |
| KCl | 0.70 |
| $Na_2SO_4$ | 3.92 |
| NaCl | 25.10 |
| de-ionized $H_2O$ to 1 liter | |

EXAMPLE 1

This example illustrates the effect of pH in causing phase separation at 100° C. of a solution of PPA and calcium ions.

A solution was prepared of 3.52 wt. % PPA and 0.33 wt. % of added calcium ions in the foregoing simulated sea water. The pH of five samples of this solution was adjusted to five different levels and each sample was held at 22 hours at 100° C. during which time the samples were monitored for hazing and phase separation. The results are shown in Table 2. No change from the initial pH of any of the samples occurred as a result of the heat treatment.

TABLE 2

| Sample | 1A | 1B | 1C | 1D | 1E |
|---|---|---|---|---|---|
| pH | 3.08 | 3.50 | 3.75 | 4.00 | 4.50 |
| minutes to initial haze | none | none | none | 1.0 | 1.0 |
| separated layer after 22 hours | none | none | none | very small | small |

As indicated in Table 2, no phase separation occurred at pH's up to 3.75 over a period of 22 hours. However, almost immediate hazing (after one minute) and eventual phase separation of a clear and small bottom layer was observed at pH's of 4.00 and 4.50 with that at 4.50 being slightly larger than at 4.00. Thus, the results indicate that the onset of phase separation (initial hazing) is a sharp function of pH at 100° C.

Example 2

This example illustrates the effect of a heat-sensitive pH-increasing substance such as urea in obtaining the advantages of this invention.

Urea in an amount of 0.80 wt. % based on the weight of the solution was added to the solution of Example 1, and four samples of the modified solution were adjusted to different pH values from 3.67 to 2.75. These samples plus, for comparison purposes, a sample to which no urea was added and adjusted to a pH of 5.00, were held at 100° C. for 24 hours. The effect of the urea in terms of pH increase and phase separation of the inhibitor, indicated by time to initial haze and percent of inhibitor phase separated, is shown in Table 3 wherein the values of initial pH were measured at 25° C. before any heat treatment, and those of final pH were measured at 25° C. after the heat treatment.

TABLE 3

| Sample | 2A | 2B | 2C | 2D | 2E |
|---|---|---|---|---|---|
| % urea | 0 | 0.8 | 0.8 | 0.8 | 0.8 |
| initial pH | 5.00 | 3.67 | 3.55 | 3.28 | 2.75 |
| final pH | 5.00 | 5.42 | 5.10 | 4.80 | 4.55 |
| time to initial haze | 1 min. | 1.2 hr | 1.8 hr | 3.8 hr | 5.2 hr |
| % inhibitor phase separated | 26 | 41 | 38 | 35 | 36 |

Table 3 shows that in contrast with sample 2A containing no urea in which phase separation occurred almost immediately at a pH of 5.00, samples 2B to 2E exhibited times to initial haze of 1.2 to 5.2 hours at initial pH's of between 3.67 and 2.75, indicating much better control of onset time for phase separation. Moreover, this control was accompanied by a rise in the pH to values between 5.42 and 4.55 caused by the decomposition of urea which in turn brought about the phase separation of substantial proportions of the inhibitor from the initial solution, viz., from 35 to 41%, for subsequent slow release into the reservoir during the production phase.

Example 3

This example illustrates the effect of the inventive process on the deposition of inhibitor in the porous structure of berea sandstone cores, which simulates the structures of certain reservoir rock formations, and the subsequent slow release or desorption of the inhibitor from such cores.

Coreflood studies were conducted on three of the inhibitor solutions shown in Example 2, viz., samples 2A, 2B and 2D, and an additional control solution containing 3.52 wt. % of PPA in sea water with no added calcium or urea. Berea sandstone cores with permeability to nitrogen of 200 millidarcies and dimensions of 1" diameter by 3" length, were presaturated with a brine 1 (simulating a well produced brine) at 95° C. in a Hassler flow cell. A 0.4 pore volume slug of inhibitor solution in sea water was injected at 20 ml per hour, followed by 3.0 ml afterflush with sea water. The core was shut-in overnight to allow equilibrium retention of the inhibitor prior to flowing back with brine 1 until no return of inhibitor was measured or until significant plugging occurred.

The composition of brine 1 is shown in Table 4.

TABLE 4

| Components | Concentration, grams/liter |
|---|---|
| $MgCl_2 \cdot 6H_2O$ | 0.77 |
| $CaCl_2 \cdot 2H_2O$ | 2.00 |
| KCl | 0.66 |
| $BaCl_2 \cdot 2H_2O$ | 0.24 |
| $SrCl_2 \cdot 6H_2O$ | 0.53 |
| NaCl | 49.19 |
| de-ionized $H_2O$ to 1 liter | |

The coreflood with solution sample 2A containing 0.33 wt. % of added calcium ions and no added urea, and having an initial pH of 5.0, plugged after overnight shut-in. Several attempts to flow back with brine 1 failed and the coreflood was terminated. Plugging probably occurred early in the shut-in period as indicated by the fact that the solution required only one minute at 100° C. to produce haze (see Example 2), due to the insolubility of the calcium salt of PPA at the relatively high pH of 5.0.

Trials with the remaining samples did not result in plugging during the overnight shut-in period. Results of all the trials are shown in Table 5, where "PV at Zero Inhibitor" indicates the number of pore volumes of brine 1 passing through the core until no release of inhibitor was measured.

TABLE 5

| Sample | % Calcium | Initial % Urea | pH | PV at Zero Inhibitor |
|---|---|---|---|---|
| 2A | 0.33 | 0.0 | 5.0 | core plugged |
| inhibitor only | 0.00 | 0.0 | 4.1 | 50 |
| 2B | 0.33 | 0.8 | 3.67 | 426 |
| 2D | 0.33 | 0.8 | 3.28 | 905 |

The results show that inhibitor solutions containing both multivalent ions such as calcium and a heat-sensitive pH-increasing substance such as urea makes possible a much higher retention of inhibitor in a porous structure and a subsequent release of inhibitor during the passage of a much larger volume of produced brines, than the use of an inhibitor solution not containing these additives. Moreover, the solutions containing both additives do not cause the rapid plugging which results from the use of an equivalent solution containing the multivalent ions but no heat-sensitive pH-increasing substance.

Example 4

This example illustrates the effect of a heat-sensitive pH-increasing substance such as urea in the delayed phase separation of a sparingly soluble calcium salt of a phosphonate scale inhibitor at 100° C.

A solution was prepared of 3.52 wt. % of diethylenetriaminepenta(methylenephosphonic acid) (DETPMP available from Monsanto as a 50 wt. % solution under the trademark "Dequest 2060") and 0.41 wt. % of calcium ions added as calcium chloride dihydrate in sea water. The pH of three samples of this solution was adjusted to three different levels and each sample was held for 22 hours at 100° C. during which time the samples were monitored for hazing and phase separation. The results for these samples indicated as 4A, 4B and 4C, are shown in Table 6. No change from the initial pH of any of the samples occurred as a result of the heat treatment.

TABLE 6

| Sample | 4A | 4B | 4C | 4D | 4E |
|---|---|---|---|---|---|
| % urea | 0 | 0 | 0 | 1.2 | 0.5 |
| initial pH | 3.18 | 2.16 | 2.57 | 2.79 | 2.59 |
| final pH | 3.18 | 2.16 | 2.57 | 4.54 | 3.06 |
| minutes to initial haze | 0 | none | none | 5 | 15 |
| phase separation after 22 hours | moderate | none | none | moderate | moderate |

As indicated in Table 6, no phase separation occurred at pH's 2.16 to 2.57 over a period of 24 hours. However, immediate hazing and phase separation of a moderate amount of an opaque bottom layer was observed at a pH of 3.18.

Urea in the amounts of 1.2 and 0.5 wt. % based on the weight of the solution was added to two solutions with initial pH's of 2.79 and 2.59 respectively. Following the same protocol as before, the results for these samples indicated as 4D and 4E are also shown in Table 6. The results show that the initial hazing can be delayed to 5 minutes and 15 minutes respectively. By further reducing initial pH and urea concentration, it is expected that phase separation can be delayed even more.

Example 5

This example illustrates that urea can be utilized to provide a time-delayed phase separation of a sparingly soluble magnesium salt of phosphino-polyacrylic acid (PPA) at 100° C.

A solution was prepared of 3.52 wt. % PPA and 1.0 wt. % of magnesium ions added as magnesium chloride hexahydrate in sea water at a pH of 3.06. The solution was held at 18 hours at 100° C. and observed for hazing and phase separation. No phase separation and no change from the initial pH occurred as a result of the heat treatment.

Urea in an amount of 0.83 wt. % based on the weight of the solution was added to a fresh sample of the above solution. When held in a 100° C. bath, phase separation occurred sometime between 3.25 hours to 18.25 hours. Analysis of the separated clear phase indicates that it contained 24% of the PPA originally charged.

Example 6

This example illustrates the use of n-butylurea as the heat-sensitive pH-increasing substance of this invention.

To the solution of PPA as scale inhibitor and calcium ions (Ca++) in the simulated sea water described in Example 1 was added sufficient n-butylurea such that its concentration in the solution was 0.0667 molar. The pH's of two samples of the solution were adjusted to 3.7 and 3.9 respectively and the solutions were heated to 120° C. and aged at that temperature overnight while the samples were monitored for haze formation, i.e., phase separation.

The solution at an initial pH of 3.7 formed an initial haze after 1.0 hour of aging and its final pH at that point was 4.4, while the solution at an initial pH of 3.9 formed an initial haze after 0.3 hour when its final pH was 4.6.

The results of this example show that n-butylurea is effective in raising the pH of the solution and causing phase separation and deposition of the scale inhibitor in a controlled fashion.

Example 7

This example illustrates that hexamethylenetetramine (HMTA) is a heat-sensitive pH-increasing compound and activates the phase separation of a calcium-DETPMP complex at 55° C. In this example, different amounts of HMTA were added to a simulated brine containing 3.5% DETPMP and 0.4% calcium ions to obtain a series of solutions with initial pH of 2.7 to 3.3. Test tubes containing 20 grams of each solution were placed in a 55° C. bath and the following properties measured: time to start of hazing (initial phase separation); final pH of the supernatant and % inhibitor phase separated after overnight aging.

The composition of the simulated brine used in this example is shown in Table 7:

TABLE 7

| Components | Grams per Liter |
| --- | --- |
| MgCl$_2$ 6H$_2$O | 1.59 |
| CaCl 2H$_2$O | 9.19 |
| NaCl | 40.40 |
| de-ionized H$_2$O to 1 liter | |

The results of this example, including those obtained with solutions containing no HMTA for purposes of comparison are shown in Table 8:

TABLE 8

| Sample | 6A | 6B | 6C | 6D | 6E | 6F | 6G | 6H |
| --- | --- | --- | --- | --- | --- | --- | --- | --- |
| HMTA, g/20 g soln. | 0 | 0 | 0.100 | 0.058 | 0.045 | 0.043 | 0.036 | 0.021 |
| initial pH | 3.4 | 4.0 | 3.3 | 3.2 | 3.1 | 3.0 | 2.9 | 2.8 |
| final pH | 3.4 | 4.0 | 3.94 | 3.82 | 3.76 | 3.70 | 3.59 | 3.55 |
| minutes to initial haze | no phase separation | 1.0 | 14 | 37 | 50 | 60 | 110 | 410 |
| % inhibitor phase separated | 0 | 34 | 38 | 31 | 26 | 19 | 9 | 5 |

As shown in Table 8, for samples 6A and 6B which did not contain any HMTA, no pH change was observed after overnight aging at 55° C., which indicates an absence of a pH-altering mechanism. In view of its relatively low pH of 3.4, sample 6A remained clear and did not phase separate. On the other hand, because of its relatively high pH of 4.0, sample 6B showed initial haze almost immediately, i.e., after only 1.0 minute, indicating lack of control of phase separation time. In contrast to samples 6A and 6B, the pH of samples 6C to 6H, which contained HMTA, rose significantly after overnight aging, and the time to initial haze varied from 14 to 410 minutes depending on the initial pH, showing that HMTA provides very good control of the phase separation time. In addition, the percent inhibitor separated increased with initial pH. The DETPMP was analyzed by a method for total phosphorus in ASTM D515-88.

Example 8

Coreflow studies were conducted to show the advantage of HMTA in providing improved treatment life of scale inhibitor. A dolomite core (having gas permeability of 19.7 millidarcies, pore volume of 8.3 ml and dimensions of 0.96" diameter by 3.1" length) was presaturated with the simulated brine (composition given in Table 7) at 55° C. in a Hassler flow cell. A 0.2 pore volume slug of inhibitor solution in simulated brine was injected at 30 ml per hour, followed by 6.0 ml afterflush with simulated brine. The core was shut-in overnight before flowing back with simulated brine. Desorption or flow back was continued until inhibitor concentration went below 0.5 ppm. The total pore volumes of brine passed up to this point was defined as the treatment life.

In the first coreflood, the inhibitor solution contained 3.5% DETPMP and 0.4% total Ca++ at a pH of 1.5. The treatment life was determined to be 960 pore volumes. In the second coreflood, the inhibitor solution contained 0.29% HMTA in addition to 3.5% DETPMP and 0.4% Ca++ at a pH of 3.2. The measured treatment life was 2144 pore volumes, 2.2 times greater than in the absence of HMTA. In both corefloods, no permeability loss was observed from the treatments.

I claim:

1. A method for the inhibition of scale deposition on the surfaces of a well coproducing oil and scale forming brines comprising injecting into the well reservoir an acidic aqueous solution at a first pH containing dissolved therein a scale inhibitor, multivalent metal ions in the presence of which said scale inhibitor is soluble at said first pH but with which it forms sparingly soluble salts at a higher pH, and a heat-sensitive pH-increasing substance containing no more than 10 carbon atoms, which decomposes at elevated temperatures liberating an alkaline compound, such that the solution is inherently heated by the higher ambient reservoir temperature to a temperature at which the alkaline compound is liberated from the heat-sensitive substance thus raising the pH of the solution to said higher pH at which a sparingly soluble multivalent metal salt of the scale inhibitor is phase separated from the solution on the porous surfaces of the reservoir rock formation, providing for a slow release of inhibitor into the produced brines when the well is in its production phase.

2. The method of claim 1 wherein said inhibitor is a polymeric polycarboxylate.

3. The method of claim 2 wherein said polycarboxylate is a polyacrylic acid.

4. The method of claim 3 wherein said polyacrylic acid is a phosphino-polyacrylic acid.

5. The method of claim 1 wherein said inhibitor is a phosphonate.

6. The method of claim 5 wherein said phosphonate is an aminomethylenephosphonate.

7. The method of claim 5 wherein said phosphonate is a polymeric phosphonate.

8. The method of claim 1 wherein said multivalent metal ions are alkaline earth, aluminum (+3), chromium (+3), iron (+3), titanium (+3), zirconium (+4), zinc (+2) or copper (+2).

9. The method of claim 8 wherein said multivalent metal ions are calcium.

10. The method of claim 8 wherein said multivalent metal ions are magnesium.

11. The method of claim 1 wherein said heat-sensitive substance is a urea derivative having the formula $$R^1R^2NCONR^3R^4$$

wherein the R's are each hydrogen or an alkyl containing 1 to 4 carbon atoms and at least one R has 3 or 4 carbon atoms.

12. The method of claim 11 wherein said heat-sensitive substance is n-propylurea or n-butylurea.

13. The method of claim 12 wherein said heat-sensitive substance is n-butylurea.

14. The method of claim 1 wherein said heat-sensitive substance is a tetraazatricycloalkane.

15. The method of claim 14 wherein said tetraazatricycloalkane is HMTA.

16. The method of claim 1 wherein said inhibitor is present in an amount of about 0.25 to 15 wt. % based on the weight of the solution, said metal ions are present in an amount of about 0.05 to 5.0 equivalents per equivalent of inhibitor, and said heat-sensitive substance is present in an amount of about 0.01 to 5.0 wt. % based on the weight of the solution.

* * * * *